US012559441B2

(12) United States Patent
Flick et al.

(10) Patent No.: US 12,559,441 B2
(45) Date of Patent: Feb. 24, 2026

(54) USE OF CARBON BLACK FOR SOIL CONDITIONING

(71) Applicant: BASF SE, Ludwigshafen am Rhein (DE)

(72) Inventors: Dieter Flick, Ludwigshafen (DE); Frederik Scheiff, Ludwigshafen (DE); Maximilian Heindl, Limburgerhof (DE); Alexander Wissemeier, Limburgerhof (DE); Andreas Bode, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 925 days.

(21) Appl. No.: 17/757,390

(22) PCT Filed: Dec. 15, 2020

(86) PCT No.: PCT/EP2020/086071
§ 371 (c)(1),
(2) Date: Jun. 15, 2022

(87) PCT Pub. No.: WO2021/122500
PCT Pub. Date: Jun. 24, 2021

(65) Prior Publication Data
US 2023/0036985 A1 Feb. 2, 2023

(30) Foreign Application Priority Data
Dec. 17, 2019 (EP) .................................... 19217107

(51) Int. Cl.
C05G 3/80 (2020.01)
C05D 9/00 (2006.01)
C05G 5/12 (2020.01)

(52) U.S. Cl.
CPC ................. *C05G 3/80* (2020.02); *C05D 9/00* (2013.01); *C05G 5/12* (2020.02)

(58) Field of Classification Search
CPC ............... C05G 3/80; C05G 5/12; C05D 9/00
See application file for complete search history.

(56) References Cited

U.S. PATENT DOCUMENTS

| | | | |
|---|---|---|---|
| 2,163,860 A | 6/1939 | White | |
| 2,165,592 A * | 7/1939 | Treeland | C05G 5/30 |
| | | | 71/64.08 |

(Continued)

FOREIGN PATENT DOCUMENTS

| | | |
|---|---|---|
| CN | 1324210 A | 11/2001 |
| CN | 104363750 A | 2/2015 |

(Continued)

OTHER PUBLICATIONS

International Search Report for PCT Patent Application No. PCT/EP2020/086071, Issued on Feb. 25, 2021, 3 pages.

(Continued)

*Primary Examiner* — Wayne A Langel
(74) *Attorney, Agent, or Firm* — Grüneberg Global IP, PLLC

(57) ABSTRACT

Carbon black can be used for soil conditioning, e.g. to promote growth of plants, to promote soil drainage, and to prevent erosion, evaporation, and silting up. The carbon back is worked into the topsoil.

11 Claims, 1 Drawing Sheet

(56) References Cited

U.S. PATENT DOCUMENTS

| | | | |
|---|---|---|---|
| 2,877,599 | A | 3/1959 | Hebestreet et al. |
| 3,341,318 | A * | 9/1967 | Chilton .................... C05F 7/02 |
| | | | 504/362 |
| 3,345,773 | A | 10/1967 | Sturgess et al. |
| 8,361,186 | B1 | 1/2013 | Shearer et al. |
| 2013/0195553 | A1 | 8/2013 | Yildirim |
| 2013/0312472 | A1 | 11/2013 | Brehmer et al. |
| 2019/0002764 | A1 | 1/2019 | Lee |
| 2021/0070668 | A1 * | 3/2021 | Hartmann ................ C05G 5/12 |

FOREIGN PATENT DOCUMENTS

| | | | | |
|---|---|---|---|---|
| CN | 109158411 | A | | 1/2019 |
| JP | S59-038271 | A | | 3/1984 |
| JP | 02-124992 | A * | 4/1990 | ............ C09K 17/00 |
| JP | H02-124992 | A | | 5/1990 |
| JP | H11-116958 | A | | 4/1999 |
| JP | H11-124575 | A | | 5/1999 |
| JP | 2001-240860 | A | | 9/2001 |
| JP | 2002-332482 | A | | 11/2002 |
| JP | 2005-253453 | A | | 9/2005 |
| JP | 2014-113140 | A | | 6/2014 |
| JP | 2016-006010 | A | | 1/2016 |
| KR | 20070066467 | A | | 6/2007 |
| RU | 2301249 | C1 | | 6/2007 |
| RU | 2301825 | C1 | | 6/2007 |
| WO | WO-2012/015313 | A1 | | 2/2012 |

OTHER PUBLICATIONS

Weber, et al., "Properties of biochar", Fuel, vol. 217, Apr. 1, 2018, pp. 240-261.

International Preliminary Report on Patentability for PCT Patent Application No. PCT/EP2020/086071, Issued on May 17, 2022, 8 pages.

Written Opinion for PCT Patent Application No. PCT/EP2020/086071, Issued on Feb. 25, 2021, 6 pages.

* cited by examiner

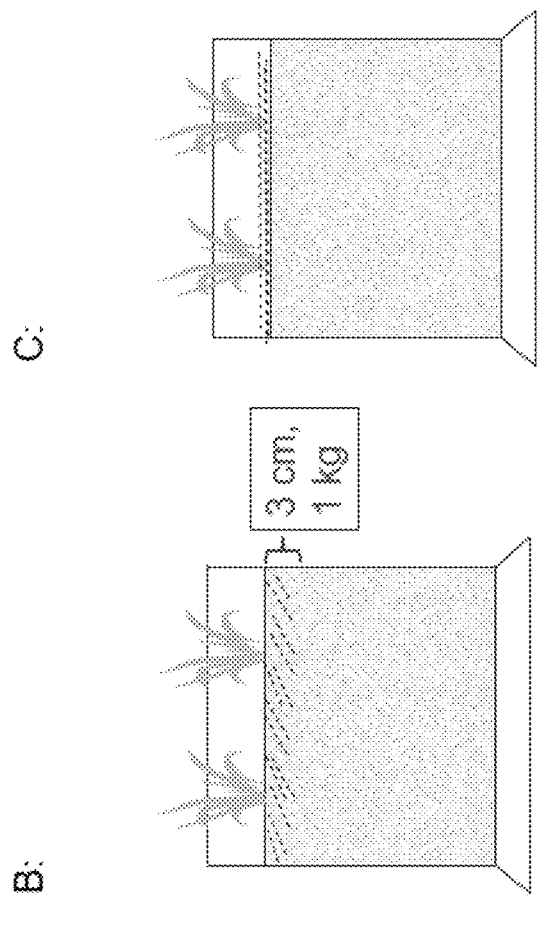
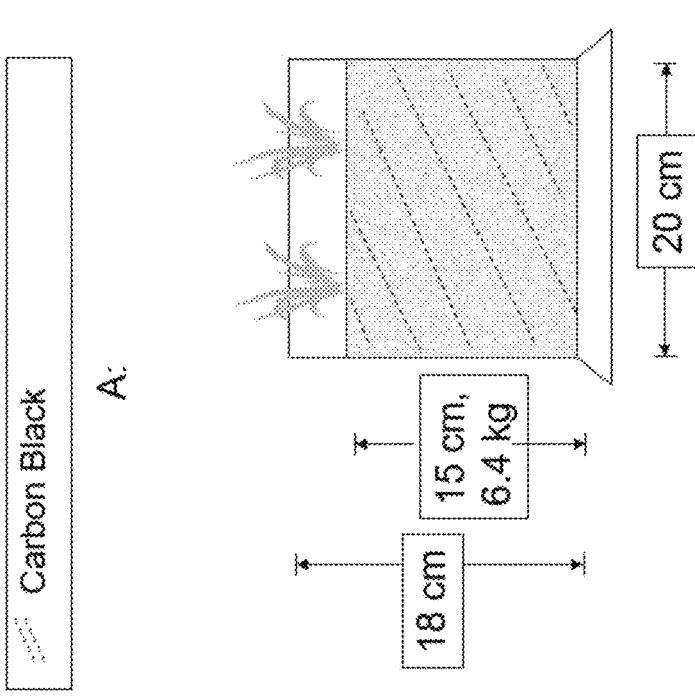

USE OF CARBON BLACK FOR SOIL CONDITIONING

CROSS-REFERENCE TO RELATED APPLICATIONS

This application is the National Stage entry under § 371 of International Application No. PCT/EP2020/086071, filed on Dec. 15, 2020, and which claims the benefit of priority to European Application No. 19217107.2, filed on Dec. 17, 2019. The content of each of these applications is hereby incorporated by reference in its entirety.

BACKGROUND OF THE INVENTION

Field of the Invention

The present invention comprises the use of carbon black for soil conditioning, e.g. to promote growth of plants, to promote soil drainage and to prevent evaporation, capping, crusting and silting up. The carbon back is worked into the topsoil.

Description of Related Art

Soil is the most important production factor for the farmers and thus, a central task for the farmer is therefore to prevent erosion, evaporation and silting up. Mulch is currently used to combat erosion, evaporation, weed control and humus depletion. Plant remains of a catch crop or the straw from the previous crop is typically used as mulch.

The disadvantage of mulch is that the organic mass binds active ingredients such as herbicides and thus reduces their effect. Mulch sowing is also time-consuming and cost intensive. In addition to mulch sowing, sometimes compost is spread on the fields. Depending on the type of compost, there may be a foul odor that lasts for days.

U.S. Pat. No. 2,877,599 discloses that carbon black having a high volume for its weight could be incorporated in the soil to darken the soil and improve heating from solar radiation and absorption and retention of water. U.S. Pat. No. 2,877,599 discloses that the carbon black is so light and fluffy (aggregate size 85-500 nm, agglomerates 1-100 μm, density 1.7-1.9 g/cm3), in a sense being highly volatile, that it cannot be deposited directly on the ground. Merely dropping it causes a substantial percentage of the carbon black to "evaporate" into the air, while the remainder of it is rapidly carried away or drifted by the wind. U.S. Pat. No. 2,877,599 sums up that it is practically impossible to add carbon black directly to the soil. Therefore, U.S. Pat. No. 2,877,599 discloses a soil conditioner in compact pellet form wherein the carbon black comprises 5 to 40%, preferably 10 to 20%, gypsum up to 50%, binder up to 1% and organic fibrous material up to 95%, e.g. sludge from sewage processing plants, waste liquor from paper mills or humus. The soil conditioner would be spread on the soil in quantity ranging from 200 pounds (90 kg) to two tons per acre (0.405 ha). It is desirable that the soil conditioner should work into the ground to a depth of two inches over a period of two years. The pellets have a diameter and length in the range from ¼ to ³⁄₁₆ of an inch.

U.S. Pat. No. 3,345,773 discloses the use of carbonaceous solids having a diameter of 0.08 inch to 0.5 inch as mulch to promote germination and growth of plants by warming the soil, preventing crusting of the soil and by retaining moisture in the soil. Various useful carbon solids are described, for example coal, e.g. lignites, anthracites and bitumen coals and coke derived from coals and from petroleum. Carbon solid is defined to include solids composed chiefly of carbon having less than about 25 weight percent volatile matter and obtained from coal or petroleum sources. The mulch is applied on top of the soil to provide a layer above the seeds having a thickness of 0.125 inch to 1.5 inch. Preferably, the carbonaceous solids are mixed with water impermeable material to provide a water barrier.

U.S. Pat. No. 3,341,318 discloses a mulch composition containing lignin sulfonate compositions, a byproduct of the paper industry, carbon black and water. These mulch compositions provide increased soil temperatures, thus assuring better germination of crop seeds and earlier emergence and earlier maturity, conserve soil moisture, reduce windblown soil loss, spray easily without clogging applicator nozzles and are non-corrosive to application equipment. The carbon black can optionally be omitted from the mulch if this is employed for herbicidal effects primarily.

Carbon sources of unknown composition i.e. carbon containing waste material are potentially hazardous as they may contain components that are environmentally harmful or toxic. Environment protective regulations require that soil additives e.g. soil conditioners are safe and do not add pollutive agents to the soil.

In view of the unknown components using waste material, WO 2012/15313 discloses a system for a manufacturing of a soil conditioner wherein a gaseous hydrocarbon source is fed to plasma cracking unit, and the produced plasma carbon is fed to a unit wherein the plasma carbon is mixed with a substrate, to produce a carbon enriched soil conditioner. The substrate to be mixed with carbon can be different soil types like sand, clay or organic waste. It is disclosed that plasma carbon with small nodule sizes (<100 nm) has several advantages as soil conditioner since it absorbs UV radiation and thus provides protection for microorganisms which are vital for the good growth conditions in soils that are exposed to strong solar radiation. WO 2012/15313 discloses that the large surface area of 50 to 1000 $m^2/g$ is important for improving the water retention properties and thus preventing dehydration of the soil. Beside the disadvantage of the effort for pelleting the carbon black, WO 2012/15313 discloses that carbon black based substrates have a continuing tendency to dust formation. However, dust enhance erosion and humus depletion and environment protective regulations require that soil additives are used in a dust-bounded form.

Although the use of carbon back as soil conditioner, especially as additive in form of pellets for covering the topsoil and thus warming up the topsoil, has a long history in literature, no widespread use is known.

Recently, biochar is disclosed as a promising soil conditioner in view of humus depletion, climate change and waste organic management.

There are mainly three benefits claimed for biochar: Soil enhancement, N2O reduction and C-Sequestration. The large surface areas of biochar could lead to a long-term water storage, the functional groups could bind nutrient and the black color could improve soil warming. The change in physical habitats in the spoil could lead to alterations of microbial community and suppress N2O emissions. The polycyclic aromatics of the biochar degrade more slowly than the original biomass being a carbon sink.

But a majority of recent studies showed only small or insignificant effects on crop yield (Martin Bach, Burkhard Wilske & Lutz Breuer (2016): Current economic obstacles to biochar use in agriculture and climate change mitigation, Carbon Management, DOI: 10.1080/17583004.2016.1213608; Steffens 2019, Lumbrico 3, 36-39; Borchard, N., Siemens, J., Ladd, B., Möller, A., Amelung, W. (2014) Application of biochars to sandy and silty soil failed to increase maize yield under common agricultural practice. Soil and Tillage Research 144, 184-194).

The average cost of biochar is at present about 400 EUR per ton. Using about 10 t/ha the profits from the increase in yield are estimated to be 1 to 10 EUR per ton per year. With an estimated median of 20 years for the biochar half-life, a large-scale application of biochar in agriculture is not profitable yet (see Bach, Müll and Abfall (2017); BUND (2015), Terra Preta/Pyrolysekohle—BUND Einschätzung ihrer Umweltrelevanz). In addition, it is questionable whether the biochar potentially available per year would fulfill market demand.

Thus, considering the current cost of biochar, the economic viability of biochar cannot recommend its general use in agricultural crop production. In addition, the conversion process of biomass into pyrolysis coal must also be critically evaluated with regard to the pollutant content in the product (especially PAH).

US 2013/312472 discloses a composition comprising pyrolyzed biomass that is utilized for soil amendment. Said pyrolyzed biomass can comprise more than 95 wt.-% of carbon and can be a granular composition with a particle size of 1 mm. It is mentioned in US 2013/312472 that owing to the high porosity, the biochar accumulates nutrients and microorganisms, such that the plants grow even in highly porous soils. The BET surface is analyzed for wood, straw, green waste and algae and determined to be in the range of 20 to 200 m2/g at pyrolysis temperature of 600-750° C.

U.S. Pat. No. 8,361,186 discloses that biomass material can be pyrolyzed and such granular pyrolytic carbon can be used as a soil conditioner. The carbon content is disclosed to be in the range from 10 to 99.5 wt.-% and the surface area in the range of 1 to 5000 m2/g.

US 2019/002764 also disclose the use of pyrolyzed and surface-oxygenated biochar with optimized hydrophilicity as a soil conditioning substrate. The substrate is in a granular from having a particle size of up to 3 mm, the carbon content is in the range of 65 to 75 wt.-% and the surface area is in the range of 0.1 to 800 m2/g.

Kathrin Weber and Peter Quicker analyzed many biochar samples in Fuel 217 (2018)240-261. The carbon content is in the range of 50 to 95 weight-%, the density of the biochar is in the range of 0.4 to 0.75 g/cc, the bulk density is about 0.3 g/cc, the BET is in the range of 1 to 700 m2/g and the total pore volume is in the range of 1 to 4.8 cm3/g, all parameters depending on the temperature of the pyrolyze.

A common method for promoting seed germination and plant growth is the use of covering black foils. The disadvantages are well known: no waterinfiltration, using of microplastic, cost- and time-consuming method, affecting the landscape adversely.

In addition to the challenges of erosion and evaporation of the soil, water infiltration and capping is a major challenge in view of the increasing risk of heavy rains due to climate changes. Capping means the displacement of soil particles at the soil surface by raindrops or generally by water movement. By drop impact (hail, heavy rain, continuous rain, irrigation) the soil aggregates are more or less mechanically crushed and fine particles or single grains are removed. The consequences of capping are: (i) Levelling; this leads to accelerated surface runoff, (ii) Closure of soil pores; this leads to a reduction in water absorption (infiltration) and (iii) Crust formation after drying; this hinders the penetration of germinating plants through the soil surface.

SUMMARY OF THE INVENTION

It is an object of the present invention to provide a process for promoting plant growth. It is a further object of the present invention to provide a process for promoting plant growth by reducing the erosion by wind and/or rain.

It is a further object of the present invention to provide a process for promoting plant growth by reducing the dust formation of topsoil.

It is a further object of the present invention to provide a process for facilitating soil tillage by a less mechanical demanding dividing of clumps and a less energy demanding soil cultivation, e.g. by harrow, ploughing or other means like rake.

In addition, it is a further object of the present invention to provide a process for promoting plant growth by increasing the radiant heat absorptivity of a seed bed, by less need for irrigation, by reducing the risk of capping, crusting, silting up and/or by suppression of weed growth.

It is a further object of the present invention to provide a process for promoting and plant growth by reducing the moisture loss to the atmosphere and thereby provide a high moisture content in the soil.

It is a further object of the present invention to provide a soil conditioner that is free of pollutive agents and even in large quantities not harmful to soil and plants.

It is a further object of the present invention to provide a carbon-containing soil conditioner that is not biodegradable and thus not emitting carbon dioxide.

It is a further object of the present invention to provide an alternative soil conditioner to biochar that is available at a reasonable price and in a sufficient amount to fulfill market demands.

Surprisingly, it was found that the effect of using carbon black as soil conditioner depends on the type of application. An overlying carbon black layer did not result in an increased plant growth as disclosed in the state of the art, whereas an uniform mixing with the topsoil resulted in both an increased shoot dry matter and increased maize-cob dry matter.

The present invention provides a process of soil conditioning including (i) providing 0.5 to 500 tons/ha carbon black on the topsoil of an agricultural field and (ii) working that carbon black into the topsoil.

In addition, the present invention provides the use of carbon black for soil conditioning, e.g. to promote growth of plants, to promote soil drainage and to prevent evaporation and silting up.

BRIEF DESCRIPTION OF THE DRAWING

The Figure shows the placement of carbon black in pot trials with maize in an Application A, an Application B, and an Application C.

DETAILED DESCRIPTION OF THE INVENTION

Carbon black is well known in the state of the art and e.g. described in Ullmann, Encyclopedia of Industrial Chemistry or in Kirk-Othmer Encyclopedia of Chemical Technology. The carbon black is typically characterized in ASTM classifications.

Carbon black is a commercial form of aggregates of carbon particles. Carbon black typically contains more than 95% pure carbon with minimal quantities of oxygen, hydrogen and nitrogen. In the manufacturing process, carbon black particles are formed that range from 10 nm to approximately 500 nm in size. These fuse into chain-like aggregates, which define the structure of individual carbon black grades.

The carbon content of the carbon black is preferably 80 to 99.8 weight-%, more preferred 85 to 99.5 weight-%, even more preferred 90 to 99.5 weight-%, even more preferred 95 to 99.5 weight-%. Typically, the impurities of the carbon black are: S in the range of 0 to 2 weight-%, preferably 0 to 1 weight-%, more preferably 0 to 0.5 weight-%. H2 in the range of 0 to 10 weight-%, preferably 0 to 5 weight-%, more preferably 0 to 2 weight-%, more preferably 0 to 1 weight-%. O in the range of 0 to 2 weight-%, preferably 0 to 1.5 weight-%, more preferably 0 to 1 weight-%, more preferably 0 to 0.5 weight-%. N in the range of 0 to 5 weight-%, preferably 0 to 3 weight-%, more preferably 0 to 2 weight-%, more preferably 0 to 1 weight-%.

Typically, the density of the carbon black is in the range of 1 to 3 g/cc, preferably 1 to 2 g/cc, preferably 1.5 to 2 g/cc (particle density). Typically, the bulk density of the carbon black is in the range of 0.01 to 0.75 g/cc, preferably 0.05 to 0.5 g/cc, more preferably 0.1 to 0.25 g/cc.

Typically, the specific surface area of the carbon black measured by Hg porosimetry (DIN66133) is in the range of 5 to 1500 m2/g, preferably 10 to 1000 m2/g, preferably 10 to 500 m2/g, preferably 10 to 250 m2/g, more preferably 10 to 200 m2/g, even more preferably 20 to 150 m2/g.

The carbon black is preferably a hydrophobic material with a preferred contact angle of water droplets of greater than 70, preferably greater than 80, more preferably greater than 90.

Plasma carbon black as known in the art can be used as carbon black in this invention.

In one embodiment, carbon black can be used directly, as produced via the plasma process, with a primary particle size of preferably 1 nm to 1 μm, more preferred 5 to 500 nm more preferred 10 to 300 nm.

In another embodiment, carbon black can be used as pellets with a particle size of preferably in the range of 0.3 to 8 mm, preferably 0.5 to 5 mm, more preferable 1 to 4 mm. Pelleting of carbon black is well known in the state of the art, typically, water can be used as binder.

The soil conditioner can be used in a quantity ranging from 0.5 to 500 tons per ha, preferably 2 to 200 tons per ha, more preferably 5 to 20 tons per ha.

Preferably, the carbon black is worked into the soil of up to 50 cm soil depth, even more preferably up to 30 cm soil depth, even more preferably up to 20 cm soil depth, even more preferably up to 10 cm soil depth, even more preferably up to 5 cm soil depth, even more preferably up to 3 cm soil depth. Preferably, the carbon black is worked in the topsoil of at least 3 cm soil depth, more preferably at least 5 cm soil depth, even more preferable at least 10 cm soil depth.

Preferably, the carbon black is worked in the topsoil homogeneously.

The techniques to work carbon black into the topsoil are known in the art, e.g. with soil tillage equipment.

In addition, the invention relates to a mixture of soil and carbon black comprising 0.25 to 25 weight-% carbon black (w/w) (soil composition comprising 0.25 to 25 weight-% carbon black), preferably 0.5 to 20 weight-%, even more preferably 1 to 15 weight-%, even more preferably 1 to 10 weight-%, even more preferably 1 to 7.5% weight-%. even more preferably 1 to 5% weight-%, even more preferably 1 to 2.5% weight-%.

Optionally, further components are added to the mixture of soil and carbon black, preferably one or more different organic or inorganic additives, e.g. agrochemical active substance from the group of fungicides, bactericides, herbicides and/or plant growth regulators.

Optionally, the soil conditioning substrate can be mixed with other commonly used soil conditioning substrates like fertilizer, liming material, commonly known soil improver, growing medium, inhibitor and/or plant biostimulant as regulated by the Regulations (EU) 2019/1009 and applied as a mixture. Optionally, the particle size of the soil conditioning substrate can be adapted to the co-conditioning substrate, e.g. via classifying.

Optionally, the carbon black can support different organic or inorganic additives, e.g. agrochemical active substance from the group of fungicides, bactericides, herbicides and/or plant growth regulators.

Advantages:

A soil conditioner for the topsoil has now been found. Thus, the carbon black can directly be used as a soil conditioner without any pelleting step.

Surprisingly and in contrast to WO 2012/15313, the present soil conditioner reduces the dust formation of the soil and hence diminish vulnerability by wind erosion, which is a great problem of dry soil without vegetation worldwide.

By mixing the soil with carbon black, both the soil is easier to till, and the soil clumps are easily decomposed to smaller aggregates. Thus, this soil is easier to work with in the agricultural sector, e.g. by harrow, ploughing or other means like rake. Reduction in power needed for soil cultivation after soil is amended with Carbon Black results in saving of fossil fuel and hence CO2 emissions.

In addition, the carbon black can remain in the soil without being converted into carbon dioxide.

EXAMPLE

1. Characteristics:

In the experiments, different applications of carbon black were tested:

TABLE 1a

| Characteristic of the carbon black | |
| --- | --- |
| | Carbon black (Cancarb Thermax N990 ultra pur) |
| Carbon content | >95 wt. % |
| Particle size | 280 nm |
| BET | 10.3 m2/g |
| Density | 1.7-1.9 g/cc |

TABLE 1b

| Characteristics of Biochar | | | | |
| --- | --- | --- | --- | --- |
| Biochar | Biochar 1 Made from Spruce wood (Prodana GmbH) | Biochar 2 Made from Root of vine (Hochschule Geisenheim University) | Biochar 3 Made from Green cutting (Hochschule Geisenheim University) | Biochar 4 Made from Wheat straw (Hochschule Geisenheim University) |
| Carbon content | 86 wt.-% | —** | —** | —** |
| Particle size | 1-2 mm | —** | —** | 1-2 mm |
| BET | 58.9 m2/g | —** | —** | 113 m2/g |
| Langmuir surface | 82.1 m2/g | —** | —** | 156 m2/g |

TABLE 1b-continued

Characteristics of Biochar

| Biochar | Biochar 1 Made from Spruce wood (Prodana GmbH) | Biochar 2 Made from Root of vine (Hochschule Geisenheim University) | Biochar 3 Made from Green cutting (Hochschule Geisenheim University) | Biochar 4 Made from Wheat straw (Hochschule Geisenheim University) |
|---|---|---|---|---|
| Density (g/cm3) | <1* | 1.13 ± 0.01 | 0.95 ± 0.13 | <1* |
| Bulk Density (g/cm3) | 0.227 | —** | —** | 0.187 |

*floating on the surface even if the solution contained a wetting agent
**no data available yet TABLE 1c Characteristic of the granular pyrolytic carbon

| | granular pyrolytic carbon |
|---|---|
| Carbon content | 98 wt.-% |
| Particle size | 1.5-2.0 mm |
| BET | <0.10 m2/g |
| Density | 1.98 g/cc |

The granular pyrolytic carbon was produced by decomposition of natural gas and deposition on calcined petroleum coke carrier material (the carrier having a particle size of 0.5-2.5 mm, a sulfur content of 1.1 wt.-% and a real density in xylene of 2.09 g/cm3) in a fluidized bed at temperatures from 1100-1300° C. and at pressures from 1-2 bar(abs).

BET: measured as described in DIN ISO 9277

Density: The specific weight (density) was determined by the Archimedes principle in pure water (see Wikipedia). Part of the experiments were done in water amended with a wetting agent to lower the surface tension of the water so that also hydrophobic particles may sink into the water if the specific weight is ≥1 g/cc.

Bulk Density: ASTM C559 "Standard test method for bulk density by physical measurement of manufactured carbon and graphite articles"

2. Wind Erosion

Experimental set-up: Installation of a wind tunnel with a gradient of different wind speeds from 0 km/h to 7 km/h (measured with Lechler Pocketwind IV Hand Aerometer, which was placed on inverted Petri dishes, on which the materials (carbon black, Biochar 1, Biochar 4) were also applied).

2.1 Wind Speed

The inverted petri dishes, on which 1.5 g of material was placed, was placed in the wind tunnel and the wind speed was increased.

TABLE 2

Wind speed from which the first particles were blown away from the petri dishes

| | Wind speed |
|---|---|
| Carbon black | 3.6 km/h |
| Biochar 1 | 1.6 km/h |
| Biochar 4 | 1.4 km/h |

2.2 Loss of Material

An inverted petri dishes, on which 1.5 g of material was placed, was placed in the wind tunnel at a wind speed of 6.4 km/h. After 5 min of wind exposure, the material remained on the petri dishes was weighed.

TABLE 3

Material remained on the petri dishes after 5 min wind exposure

| | material remained on the petri dishes [g] | material remained on the petri dishes [%] |
|---|---|---|
| Carbon black | 1.38 g | 93% |
| Biochar 1 | 0.58 g | 39% |
| Biochar 4 | 0.54 g | 36% |

Covering the topsoil with carbon black reduces the erosion effects by wind.

3. Dust Formation

The dust formation of carbon black (CB), Pyrolysis Carbon (PC), air dried soil Limburgerhof, and mixtures of CB and PC with air dry soil Limburgerhof was quantified under standardized condition by the device "DustView II" from Palas GmbH, Karlsruhe, Germany according to the guidelines of the manufacturer (https://www.palas.de/product/dustview2).

30 g of material is dropped from 750 mm height and dust formation quantified as extinction of a laser beam in the dust room (0=no dust formation, 100=maximal light extinction due to dust). The dust number is the integral of the light extinction over a time span of 30 sec. For each sample three measurements were conducted, and the results statistically evaluated by the Analysis of variance.

TABLE 4

Dust Formation

| | Mean measured dust number | Standard deviation | Calculated via "Dust number" of the mixtures from the components assuming additive interactions |
|---|---|---|---|
| Soil Limburgerhof | 71.7 | ± 5.9 | |
| Pyrolytic carbon (PC) | 2.4 | ± 0.5 | |
| Carbon black (CB) | 3.7 | ± 1.1 | |
| Soil with 2.44% (w/w) PC | 58.7 | ± 8.5 | 70.0 |
| Soil with 1.23% (w/w) CB | 34.8 | ± 1.9 | 70.8 |
| Soil with 2.44% (w/w) CB | 27.1 | ± 3.1 | 70.0 |
| Soil with 4.76% (w/w) CB | 21.9 | ± 1.6 | 68.4 |

The measured dust number of air-dry soil Limburgerhof is much higher than of PC or CC alone, with PC being lower than CC. Mixtures of the soil with PC and CB reduce dust formation significantly. However, if the low intrinsic dust formation of PC in the mixture with soil is taken into account, the low dust number of soil with 2.44% PC of 70.0 is statistically not different from the untreated soil (71.7±5.9).

But, with an increasing amount of CC added to soil (1.23, 2.44, 4.67% by weight) dust formation decreases significantly, which cannot be explained by a dilution effect as in the case of PC.

Thus CC, but not PC, has an intrinsic strong effect in reducing dust formation of dry soil as additive.

4. Soil Clumps and Soil Cultivation, Workability of the Soil

Soil Oberding (silt loam, pH(CaCl2)) 7.5) without soil additives and treated with 8 t/ha barbon black (applied around one year prior to the assessment of surface structure)

were compared for the presence of soil clumps (soil aggregates) two weeks after the soils were uniformly raked. Four soil sites (0.35 m² each) were randomly chosen from each treatment and photographed. On the print-out with a ruler the clumps >40 mm in length and ≥10 mm to 40 mm in length were counted and calculated as numbers per m². By Analysis of Variance the significance in differences were calculated among the soil treatments.

TABLE 5

| Presence of soil clumps after raking | | |
| --- | --- | --- |
| | Number of soil clumps >40 mm per m2; mean, ± SD | Number of soil clumps >10 mm to <40 mm per m2; mean, ± SD |
| Soil without carbon black | 18.4, ± 11.4 | 57.7, ± 2 9.1 |
| Soil with 8 t/ha carbon black | 6.8, ± 3.7 | 19.8 ± 2.5 |
| Soil with 8 t/ha pyrolytic carbon | 19.9 ± 6.3 | 49.8 ± 11.2 |

Soil clumps >40 mm in length are 60% less if the soil is treated with carbon black (P=0.10), while soil clumps ≥10 mm und <40 mm are 66% less (P=0.04).

Moreover, the physical power needed for soil cultivation was less in the soil amended with Carbon black compared to the untreated soil. An effect on soil clumps and workability of soil could not be seen after the addition of granular pyrolytic carbon.

Summing up, significant soil effects by addition of carbon black could be surprisingly detected on soil physics, which was not the case for pyrolysis carbon.

5. Ability of Water Absorption

At the beginning, the samples were dried down. The air humidity was gradually increased from 0%-90% in 10% steps, whereas the criterion for next stage was the mass fluctuation <0.05% in 45 min.

TABLE 6

| Water absorption | | | | |
| --- | --- | --- | --- | --- |
| Sample | Water absorption [wt.-%] | Start value rel. air humidity | Duration | End value rel. air humidity | Temperature |
| Carbon black | 0.031% | 0% | 147 h | 70% | 25° C. |
| Biochar 1 | 7.25% | 0% | 147 h | 70% | 25° C. |
| Biochar 4 | 12.5% | 0% | 147 h | 70% | 25° C. |
| Pyrolytic carbon | 0.0023% | 0% | 147 h | 70% | 25° C. |

Table 6 shows the low water absorption of carbon black and pyrolytic carbon compared to biochar due to the low surface area and the hydrophobic surface.

6. Formation of Biomass:

Application (see the FIG.) and Testing Methods

Pot Trial with Maize:

Soil Limburgerhof (loamy sand, pH 6.8) was used to fill into so called Mitscherlich pots filled with 6.4 kg dry soil each pot. As a basal fertilization each pot received 99 mg Mg as MgSO4×7 H2O, and 0.436 g P and 1.1 g K as K2HPO4, and 1 g N as NHNO3.

The carbon samples were either uniformly mixed with the soil (Application A), uniformly mixed with 1 kg of soil which was placed on top of the other unamended 5.4 kg of soil (Application B), or the carbon samples were placed on top of the soil after the maize plants had emerged nine days after seeding (Application C), see the Figure.

With 314 cm² soil surface per pot 2, 4, 8, 16 t C/ha equals 6.3, 12.5, 25, 50 g C/pot, respectively.

Six seeds of *Zea mays* (L.) cv. "Amadeo" were seeded per pot (5 Jun. 2019). After emergence plants were first thinned to uniformly three plants per pot and later to one plant per pot, which then was cultivated until maturity. As a second dress the pots were fertilized with 1 g N as NH4NO3 and finally as a third dress each pot received 6.7 g of the complex fertilizer Nitro-phoska® perfect (15+5+20S+2+8+ trace elements) on June 28.

Each carbon black treatment had 4 replicates, the untreated control had all in all 8 replicates. The pots were placed fully randomized on a conveyor table in the vegetation hall Limburgerhof which has been described by Jung (1967).

From Monday to Friday the pots were watered two times a day after weighing to 70% of the maximum water holding capacity of the soil. (The differences in weight of the pots due to the addition of the carbon samples were taken into account by extra weight.) On Saturday and Sunday pots were watered horticulturally according to need without weighing.

The harvest took place on October 2nd by dividing the shoot into the cob and the rest of the plant so that both total dry matter (Tab. 7) and cob dry matter (Tab. 8) could be determined after drying the plant biomass in a forced oven at 80° C. until constant weight.

Application A: uniform mixing with the whole soil of the used plant pot (0-15 cm, 6.4 kg soil)

Application B: uniform mixing with the top soil (0-3 cm, 1 kg soil)

Application C: mulch on top of the soil, 9 days after emergence of plants.

The Figure: Application A, B, C and placement of carbon black in pot trials with maize.

Comparison of Test Results

TABLE 7

Total shoot dry matter per maize plant and pot in gram as mean of n replicates, ± standard deviation and as percentage of untreated control = 100%. For the distribution of carbon black ("application") see FIG. 1. "—" indicate no variant.

| Application | Control | Carbon black (2 t/ha) | Carbon black (4 t/ha) | Carbon black (8 t/ha) | Carbon black (16 t/ha) |
| --- | --- | --- | --- | --- | --- |
| A | 105.2 ± 5.9 | 113.2 ± 4.1 | 117.6 ± 5.3 | 115.7 ± 13.2 | 116.4 ± 4.7 |
| | (n = 8) | (n = 4) | (n = 4) | (n = 4) | (n = 4) |
| | (100%) | (108%) | (112%) | (110%) | (110%) |
| | | | 115.7 ± 7.2 (n = 16) (110%) | | |
| B | 105.2 ± 5.9 | — | 108.0 ± 13.8 | 110.5 ± 5.5 | 102.0 ± 6.6 |
| | (n = 8) | | (n = 4) | (n = 4) | (n = 4) |
| | (100%) | | (103%) | (105) | (97x%) |
| | | — | 106.8 ± 9.3 (n= 12) (101%) | | |
| C | 105.2 ± 5.9 | — | — | — | 104.3 ± 13.0 |
| | (n = 8) | | | | (n = 4) |
| | (100%) | | | | (99%) |

TABLE 8

Maize-cob dry matter per plant and pot in gram
as mean of n replicates, ± standard deviation
and as percentage of untreated control = 100%.
For the distribution of carbon black ("application")
see FIG. 1. "—" indicate no variant.

| App-lication | Control | Carbon black (2 t/ha) | Carbon black (4 t/ha) | Carbon black (8 t/ha) | Carbon black (16 t/ha) |
|---|---|---|---|---|---|
| A | 67.2 ± 5.0 (n = 8) (100%) | 74.6 ± 2.5 (n = 4) (111%) | 79.4 ± 3.6 (n = 4) (118%) | 77.8 ± 9.6 (n = 4) (116%) | 76.9 ± 3.8 (n = 4) (111%) |
| | | | 77.2 ± 5.3 (n = 16) (115%) | | |
| B | 67.2 ± 5.0 (n = 8) (100%) | | 70.6 ± 7.2 (n = 4) (105%) | 75.0 ± 4.2 (n = 4) (112) | 67.0 ± 6.2 (n = 4) (100%) |
| | — | | 70.9 ± 6.4 (n = 12) (106%) | | |
| C | 67.2 ± 5.0 (n = 8) (100%) | | | | 66.9 ± 8.8 (n = 4) (98%) |

Surprisingly, the applications A shows much better results than application B and C.

Biodegradability:

The biodegradability was tested by measuring the soil respiration after addition of carbon black at an application rate of 313 mg per 50 g soil (soil Limburgerhof; loamy sand, pH 6.8) what is equivalent to some 2 t C/ha. Soil without additions or with the addition of 50 mg ground wheat straw to 50 g soil (0.32 t/ha) were controls. The soil respiration was measured with WTW Ox-iTop (Weilheim, Germany) placed in incubators at 20° C. according to the method outlined by Robertz et al. (1999) and Malkomes and Lemnitzer (2009).

In Tab. 8 it can be seen that the straw caused a strong soil respiration while carbon black did not cause any $CO_2$ evolution higher than the unamended soil.

TABLE 9

Soil respiration (CO2 emission) of soil Limburgerhof cumulated
over time at 20° C. without or with addition of straw or
carbon black; MW = mean value, n = 4, ±SD = standard deviation.

| Incubation time | Soil without C addition | | Straw ground (0.32 t C/ha) | | Carbon black (2 t/ha) | |
|---|---|---|---|---|---|---|
| [weeks] | Soil respiration [mg CO2-C/50 g dry soil, cumulated] | | | | | |
| | MW | ±SD | MW | ±SD | MW | ±SD |
| 1 | 0.7 | 0.2 | 19.1 | 0.7 | 0.8 | 0.2 |
| 2 | 1.5 | 0.3 | 26.3 | 0.8 | 1.7 | 0.3 |
| 3 | 2.4 | 0.3 | 29.5 | 0.8 | 2.6 | 0.3 |
| 4 | 3.1 | 0.4 | 31.7 | 0.8 | 3.3 | 0.4 |
| 5 | 3.7 | 0.4 | 33.4 | 0.8 | 4.0 | 0.4 |
| 6 | 4.3 | 0.4 | 34.7 | 0.8 | 4.5 | 0.5 |
| 7 | 4.9 | 0.5 | 35.0 | 0.3 | 5.2 | 0.5 |
| 8 | 5.5 | 0.5 | 35.4 | 0.2 | 5.8 | 0.6 |
| 9 | 6.0 | 0.5 | 35.7 | 0.2 | 6.3 | 0.6 |
| 10 | 6.4 | 0.6 | 36.4 | 0.2 | 6.8 | 0.6 |
| 11 | 7.0 | 0.6 | 36.9 | 0.2 | 7.3 | 0.7 |
| 12 | 7.4 | 0.6 | 37.2 | 0.3 | 7.7 | 0.7 |
| 13 | 7.8 | 0.6 | 37.5 | 0.4 | 8.1 | 0.7 |
| 14 | 8.4 | 0.6 | 37.5 | 0.7 | 8.7 | 0.7 |
| 15 | 8.9 | 0.6 | 38.6 | 0.9 | 9.2 | 0.7 |

TABLE 9-continued

Soil respiration (CO2 emission) of soil Limburgerhof cumulated
over time at 20° C. without or with addition of straw or
carbon black; MW = mean value, n = 4, ±SD = standard deviation.

| Incubation time | Soil without C addition | | Straw ground (0.32 t C/ha) | | Carbon black (2 t/ha) | |
|---|---|---|---|---|---|---|
| [weeks] | Soil respiration [mg CO2-C/50 g dry soil, cumulated] | | | | | |
| | MW | ±SD | MW | ±SD | MW | ±SD |
| 16 | 9.4 | 0.6 | 39.6 | 1.0 | 9.6 | 0.8 |
| 17 | 9.9 | 0.6 | 40.5 | 1.1 | 10.1 | 0.7 |

REFERENCES

Jung, J. (1967): Eine neue Vegetationshalle zur Durchführung von Gefäßversuchen. Z. Acker-u. Pflanzenb. 126, 293-297.

Malkomes, H.-P., Lemnitzer, B. (2009): "Vergleich der mittels URAS und OxiTop Control gemessenen Substrat-induzierten Kurzzeitatmung im Boden beim mikrobiologisch-ökotoxikolog-ischen Monitoring von Pflanzenschutzmitteln. I. Einfluss eines Herbiziden Referenzmittels und eines Neutralsalzes", Nachrichtenblatt Deutscher Pflanzenschutzdienst, 60, 104-112.

Robertz, M., Muckenheim, Th., Eckl, S., Webb, L. (1999): "Kostengünstige Labormethode zur Bestimmung der mikrobiellen Bodenatmung nach DIN 19737", Wasser & Boden, 51/5, 48-53.

The invention claimed is:

1. A process of soil conditioning, including:
(i) providing 2 to 500 tons/ha of hydrophobic carbon black on a topsoil of an agricultural field, and
(ii) working the hydrophobic carbon black into the topsoil.

2. The process according to claim 1, wherein the hydrophobic carbon black is worked into the topsoil to a soil depth of at least 3 cm.

3. The process according to claim 2, wherein the hydrophobic carbon black is worked into the topsoil homogeneously.

4. The process according to claim 1, wherein the hydrophobic carbon black is worked into the topsoil up to a soil depth of 10 cm.

5. The process according to claim 1, wherein a carbon content of the hydrophobic carbon black is 95 to 99.5 weight-%.

6. The process according to claim 1, wherein the hydrophobic carbon black is a hydrophobic material with a contact angle of water droplets of greater than 70.

7. The process according to claim 1, wherein 5 to 20 tons/ha of the hydrophobic carbon black are provided on the topsoil of the agricultural field.

8. The process according to claim 1, wherein a particle size of the hydrophobic carbon black is 1 nm to 1 μm.

9. The process according to claim 1, wherein pellets of the hydrophobic carbon black have a particle size of 0.3 to 8 mm.

10. The process according to claim 1, wherein the hydrophobic carbon black supports at least one different organic or inorganic additive.

11. The process according to claim 1, wherein a carbon content of the hydrophobic carbon black is 80 to 99.8 weight %.

* * * * *